United States Patent [19]

Silke

[11] Patent Number: 5,116,190

[45] Date of Patent: May 26, 1992

[54] REMOTELY ADJUSTABLE COMPLIANCE FOR END EFFECTOR TOOLING

[75] Inventor: Gerald W. Silke, El Cajon, Calif.

[73] Assignee: General Atomics, San Diego, Calif.

[21] Appl. No.: 561,809

[22] Filed: Aug. 2, 1990

[51] Int. Cl.⁵ .............................................. B25J 17/02
[52] U.S. Cl. .................................... 414/735; 74/469; 294/86.4; 403/291; 414/626; 414/786; 901/29; 901/45
[58] Field of Search ............... 414/626, 735, 786; 294/86.4; 901/21, 27, 28, 29, 45; 74/469; 403/291

[56] References Cited

U.S. PATENT DOCUMENTS

| | | | |
|---|---|---|---|
| 2,927,432 | 3/1960 | Parry | 60/54.5 |
| 3,284,964 | 11/1966 | Saito | 52/2 |
| 3,411,324 | 11/1968 | Federline | 64/19 |
| 3,583,752 | 6/1971 | Panissidi | |
| 4,107,948 | 8/1978 | Molaug | 64/2 |
| 4,260,187 | 4/1981 | Frosch et al. | 294/86.4 |
| 4,300,362 | 11/1981 | Lande et al. | 64/17 |
| 4,393,728 | 7/1983 | Larson et al. | 74/469 |
| 4,540,331 | 9/1985 | Stanner et al. | 294/86.4 X |
| 4,588,348 | 5/1986 | Beni et al. | 414/730 |
| 4,614,084 | 9/1986 | Clot et al. | 60/325 |
| 4,640,137 | 2/1987 | Trull et al. | 73/862.04 |
| 4,739,241 | 4/1988 | Vachtsevanos | 318/800 |
| 4,745,812 | 5/1988 | Amazeen et al. | 73/862.04 |
| 4,815,911 | 3/1989 | Bengtsson et al. | 901/21 X |

FOREIGN PATENT DOCUMENTS

| | | |
|---|---|---|
| 3612961 | 10/1986 | Fed. Rep. of Germany |
| 422580 | 9/1974 | U.S.S.R. |
| 1083017 | 3/1984 | U.S.S.R. |
| 1114546 | 9/1984 | U.S.S.R. |
| 1184666 | 10/1985 | U.S.S.R. |
| 1222538 | 4/1986 | U.S.S.R. |
| 1227457 | 4/1986 | U.S.S.R. |
| 1238959 | 6/1986 | U.S.S.R. |
| 1315290 | 6/1987 | U.S.S.R. |

Primary Examiner—Robert J. Spar
Assistant Examiner—Donald W. Underwood
Attorney, Agent, or Firm—Nydegger & Associates

[57] ABSTRACT

A cable suspension compliance mechanism has a top plate for attaching the mechanism to a robot and a bottom plate for attaching the mechanism to a gripping device. Steel cables interconnect the plates and maintain the plates substantially parallel relative to each other. Pneumatic cylinders are also disposed between the plates to adjust the mechanism's stiffness by adjusting the tension of a selected number of the steel cables. The mechanism is also equipped with magnetic inductance sensors to sense the position and classification of the article to be gripped. Additionally, the mechanism has an overtravel sensor to indicate the presence of unexpected obstacles, and to stop the mechasnism in response thereto.

13 Claims, 3 Drawing Sheets

REMOTELY ADJUSTABLE COMPLIANCE FOR END EFFECTOR TOOLING

FIELD OF THE INVENTION

The Government has rights in this invention pursuant to Contract No. DAAK-11-84-C-0028 awarded by the United States Department of the Army.

The present invention relates generally to robotic devices used to manipulate payloads or transfer payloads from one location to another. More specifically, the present invention relates to robotic devices which transfer or manipulate payloads in a hostile environment. The present invention is particularly, though not exclusively, useful for applications of robotic devices which require lateral and vertical compliance in the end-of-arm tooling of the robotic devices.

BACKGROUND OF THE INVENTION

The use of robots has increased dramatically in recent years. In industry, robots are increasingly used in a wide variety of applications which require manipulation of hazardous objects, or manipulation of objects in hostile environments. For example, robots have been introduced to safely and reliably handle hazardous payloads, such as chemical or high explosive munitions, in order to reduce exposure to the risks that would occur to human operators if they directly performed the weapons handling. Additionally, robots have been designed which can reliably operate in environments that are relatively hostile to man. As can be appreciated, the robots used in industry are typically multipurpose devices which often must be capable of grasping a wide variety of articles. To this end, robotic devices are provided with end-of-arm toolings, commonly called end effectors, which are used to grasp the article or articles to be manipulated or transported. To be effective, end effectors should be compliant, i.e. be sufficiently flexible to safely and reliably engage articles which are positionally mismatched vis-a-vis the end effector. In addition to having an acceptable degree of compliance, end effectors must also be capable of establishing a relatively high degree of stiffness to prevent undue swaying or swinging of an article once the article has been grasped. Obviously, achieving both characteristics in a single end effector can be a complicated problem, given the mutually exclusive natures of compliance and stiffness.

A number of devices have been suggested which attempt to satisfy the compliance requirement, while maintaining acceptable degrees of stiffness. One genre of such devices is linear ball bushings. Such devices typically comprise ball bushings disposed on precision shafting to provide for substantially frictionless compliance between a robot and the article to be manipulated. Linear ball bushings, however, have several drawbacks. For example, a complete set of bearings and shafting is needed for each required axis of compliance. This effector apparatus, Moreover, exposed bearing shafts are subject to contamination and corrosion which can hinder free motion of the bearings along the shaft. Similarly, other types of end effector mechanisms well known in the pertinent art such as parallelogram linkages and angular spring centering devices, are often bulky and complex mechanisms.

An effective and relatively simple end effector apparatus that provides for adequate compliance in both the vertical and horizontal axes is the suspension cable end effector. Typically, this type of compliance mechanism uses high strength cabling, such as stainless steel aircraft cables, to connect a robot to an article gripping device. In addition to the cable, structure must be provided to adequately stiffen the end effector for transporting or manipulating an article, once the article has been gripped. Ideally, the stiffening structure is releasable before and after article manipulation, to provide for sufficient compliance when gripping potentially misaligned articles or releasing the articles to an unsupported location.

In addition to the above compliance and stiffness considerations, end effectors should also ideally provide for protection against inadvertent crashes of the end effector into surrounding equipment or articles which are to be manipulated. Moreover, in hostile environments, such as are often encountered in the demilitarization of certain types of warheads, end effectors must withstand exposure to corrosive chemical agents such as liquid nitrogen, sodium carbonate or sodium hypochlorite.

Further to the above discussion, an object of the present invention is to provide a robotic end effector tooling apparatus which provides adequate compliance between a robot and an article to be manipulated. Another object of the present invention is to provide a robotic end effector tooling apparatus which is capable of being made sufficiently stiff to prevent undue relative motion between the robot and a gripped article. Additionally, an object of the present invention is to provide a robotic end effector tooling apparatus which can withstand relatively severe crashes. Still another object of the present invention is to provide a robotic end effector tooling apparatus which is capable of remote operation in a hostile environment. Finally, the present invention recognizes a need to provide a robotic end effector tooling apparatus which is relatively simple in construction and which is cost effective to make and use.

SUMMARY OF THE INVENTION

A cable suspension compliance mechanism in accordance with the present invention comprises a top plate which is attachable to a robotic device and a bottom plate which is attachable to an end-of-arm gripper mechanism. The plates are interconnected and are normally held parallel relative to each other by a plurality of cables and stiffeners. Specifically, four parallel suspension cables of substantially equal length connect the bottom plate to the top plate, with the longitudinal axes of the cables normally in a position where they are substantially perpendicular to the planes of the plates.

To provide for selectively stiffening the mechanism, a pair of rigidizers are mounted between the plates. As contemplated by the present invention, each rigidizer comprises in combination a tensioning arm, a pair of tensioning cables and a pneumatic stiffener. More specifically, each of the two separate tensioning arms are pivotally attached to the top plate and each is respectively connected to an end of two of the four tensioning cables. These tensioning cables are disposed diagonally between the plates and interconnect their respective tensioning arms with the bottom plate to provide stiffness to the mechanism. In order to help provide for adjustable degrees of mechanism stiffness, the tensioning arms are each movable between a first position wherein the attached tensioning cables are substantially slack, and a second position wherein the attached tensioning cables are substantially taut. Each arm is moved between its respective positions by the pneumatic cylinder stiffener, which is pivotally mounted on the bottom plate and is operably connected with its respective tensioning arm. Accordingly, as stated above, each individual combination of an arm, an associated cylinder, and its two associated tensioning cables comprises a single rigidizer. Consequently, in response to remote control orders, the lengthening and shortening of the pneumatic cylinder stiffeners will respectively shift the tensioning arms between their first and second positions.

Attached to the bottom plate of the mechanism are four magnetic inductance proximity sensors which are used to sense the position of an article to be engaged by the end-of-arm gripper mechanism. Also attached to the mechanism's bottom plate are eight magnetic inductance proximity sensors which sense the presence of code plugs that can be embedded in the article to be gripped. With these sensors, it is possible to classify the article. Moreover, the mechanism also comprises an overtravel sensor to sense the presence of unexpected obstacles. In particular, when the mechanism is in its compliant configuration and is lowered onto an unexpected obstacle, the slack suspension and tensioning cables do not resist the force of the impediment. This allows the top plate to continue to descend toward the bottom plate for a predetermined distance. Unless the impediment yields before the predetermined distance is exceeded, the overtravel sensor stops the mechanism to prevent further lowering of the mechanism onto the obstacle.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
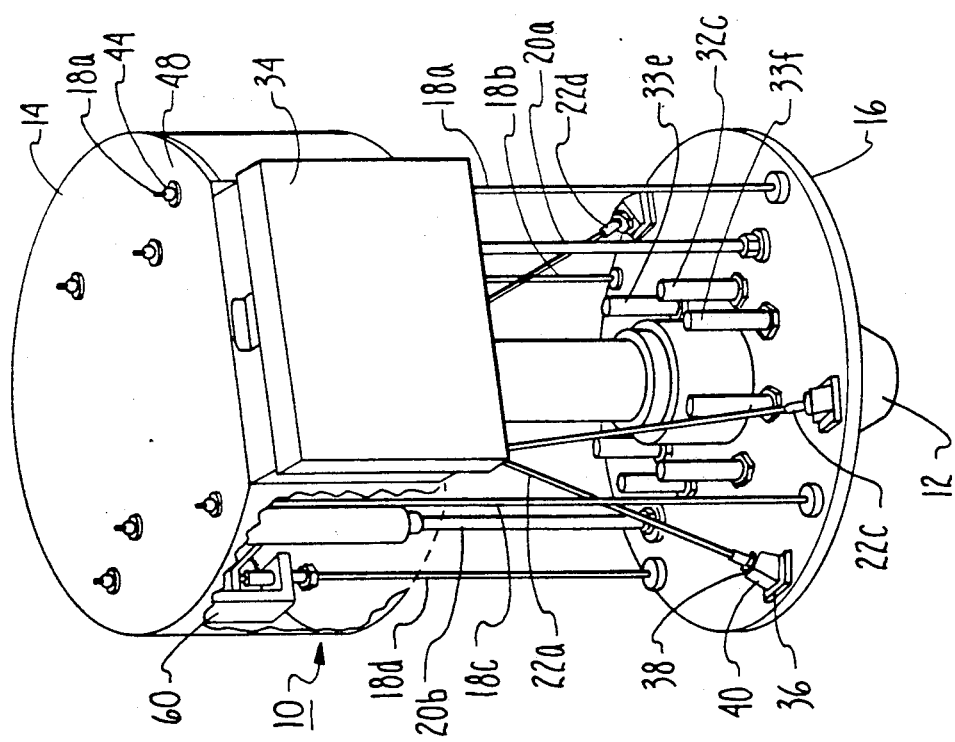
FIG. 1 is a perspective view of the novel end effector, with portions cut away for clarity.

Initially referring to FIG. 1, an end effector apparatus, generally designated 10, is shown connected to a gripping device 12. More specifically, end effector 10 comprises a top plate 14 for mounting end effector 10 onto a robot (not shown), a bottom plate 16 suspended beneath top plate 14, and a plurality of suspension cables 18a-d interconnecting the plates 14 and 16. Also shown in FIG. 1 are stiffeners 20a and 20b and tensioning cables 22a-c, (22d not shown in FIG. 1) which, in addition to suspension cables 18, interconnect top plate 14 and bottom plate 16 through their respective tensioning arms 51a and 51b. An electrical junction box 34 is shown bolted to end effector 10 for providing necessary electrical connections.

Figure 2:
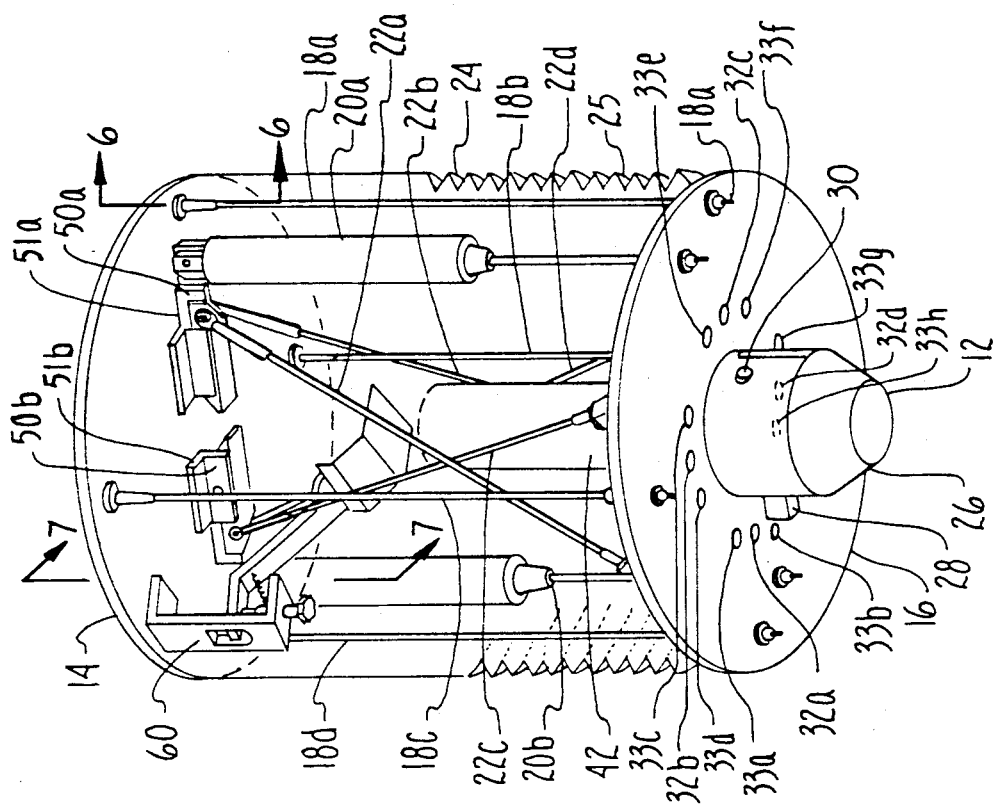
FIG. 2 is a perspective view of the novel end effector, showing one type of gripping device, with portions cut away for clarity.

The details of end effector apparatus 10 are best seen in reference to FIG. 2. There, a housing 24 (shown cut-away) is shown to envelop the components of end effector 10 and protect end effector 10 from dirt, abrasions, and other vagaries of potentially hostile environments. It will be understood that housing 24 may completely envelop end effector 10, and may be suitably mounted on or between plates 14 and 16 by any means known in the art, such as bolting or welding. Further, housing 24 may include a flexible bellows 25 to permit some movement between top plate 14 and bottom plate 16.

Also shown in FIG. 2 is one embodiment of gripping device 12. As can be appreciated, a wide variety of gripping device 12 configurations may be used, depending on the particular application of end effector 10. In the embodiment shown, gripping device 12 comprises a conical-shaped body 26, a gripping finger 28 which is pivotally mounted on body 26, and a finger pivot 30, which operates as disclosed more fully below. As intended for the present invention, gripping device 12 may be removably or permanently mounted on bottom plate 16 by any well-known means, such as by bolting, or welding. Device 12 may also have a threadable engagement with an adapter (not shown) which may be provided on bottom plate 16.

Also shown mounted on bottom plate 16 are part sensors 32a-d and 33a-h. Part sensors 32a-d and 33a-h may comprise any sensor suitable for detecting the presence of an article to be gripped. In addition, part sensors 32a-d and 33a-h must be sufficiently rugged to operate in potentially hostile or jarring environments. Moreover, the number and disposition of part sensors 32a-d and 33a-h about plate 16 ideally provide for reliable part position detection, as well as part classification and part orientation determinations. To these ends, the embodiment shown in FIGS. 1 and 2 uses four inductive type proximity part sensors 32a, b, c, and d disposed on cardinal axes of plate 16 for part proximity sensing. Additionally, two more inductive type proximity sensors 33 are disposed adjacent to each of the four sensors 32, as shown in FIGS. 1 and 2, making a total of twelve identical sensors 32 and 33 disposed on plate 16. As can be appreciated by the skilled artisan, the eight additional sensors 33a, b, c, d, e, f, g, h described above can couple with analagous coding plugs which may be pre-positioned in the article to be gripped. It is to be appreciated that part sensors 32a-d and 33a-h are electrically connected to external signal processors (not shown) through junction box 34.

As perhaps best seen in FIG. 1, bottom plate 16 provides a bottom mounting base for suspension cables 18, stiffeners 20, and tensioning cables 22. With respect to cables 22, each of the cables 22 is fixedly attached to bottom plate 16 by any means well known in the art, such as by bolting. In particular, bottom mount 36 of tensioning cable 22a should provide for substantially non-perpendicular mounting of tensioning cable 22a relative to base 16, as shown in FIG. 1. Taking tensioning cable 22a as an example, it may be seen that face 38 of mount body 40 is disposed at an obtuse angle with respect to base 16. This combination of structure provides for the angular mounting of tensioning cable 22a substantially as shown in FIGS. 1 and 2.

In contrast to the above-disclosed method for mounting cables 22 on bottom plate 16, suspension cables 18 are rotatably mounted on top plate 14 to provide for substantially frictionless compliance of end effector 10. Specifically, FIG. 6 shows one generic type of rotatable mounting, which may be used in the present invention for mounting suspension cables 18 to both top plate 14 and bottom plate 16. While FIG. 6 shows a single cable 18a mounted to top plate 14, it will be appreciated that the following discussion of cable 18a mounting on top plate 14 applies equally to the mounting of all the cables 18a-d on both top plate 14 and bottom plate 16. In particular, FIG. 6 shows cable 18a disposed within a ball 44. Prior to mating cable 18a and ball 44, it will be understood that a passage which is marginally larger than the diameter 46 of cable 18a is drilled through ball 44. Then, cable 18a is inserted through the passage in ball 44, and ball 44 is subsequently compressed, or swaged, around cable 18a to establish a fixed press fit. As further shown in FIG. 6, ball 44 rests on conical collar 48, which is in turn attached to the appropriate plate (top plate 14 in FIG. 5) by any means well known in the art. Thus, cable 18a is partially rotatable on the plate 14. To provide additional structural support to cable 18a, a cable support 43 is fixed circumferentially around a portion of cable 18a, as shown. Finally, it will be understood that other mounting embodiments which are similar to the one discussed above are contemplated by the present invention, such as ball-washer mounts Again referring to FIGS. 1 and 2, it will be appreciated that stiffeners 20 are mounted on bottom plate 16 in a manner similar to suspension cable 18 mounting. This again provides for relatively frictionless compliance of end effector 10 when end effector 10 is in its compliant configuration. As further shown in FIG. 1, base 16 also provides a mounting platform for gripper actuator 42. Gripper actuator 42 houses the apparatus necessary for manipulating gripper 12, such as servo control systems and associated hydraulics. It will be appreciated that gripper actuator 42 is also electrically connected to junction box 34 to provide control and operating power to gripper 12.

Figure 5:
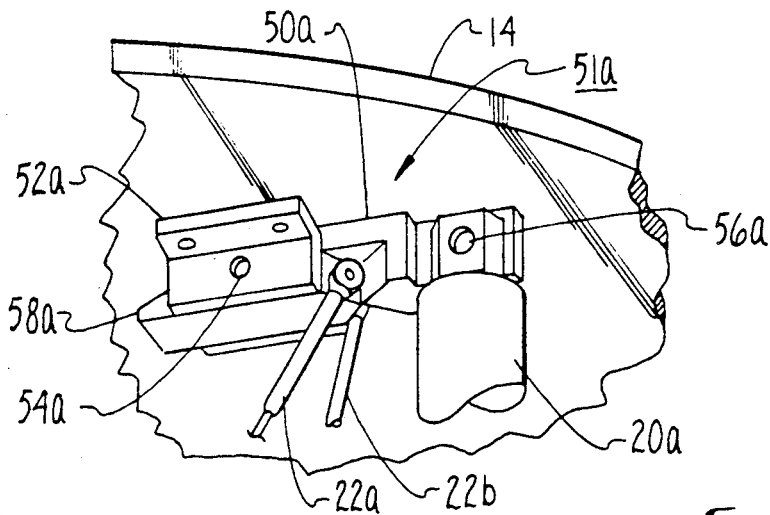
FIG. 5 is a perspective view of a portion of the diagonal cable tightening mechanism in relation to part of the top plate.
Figure 6:
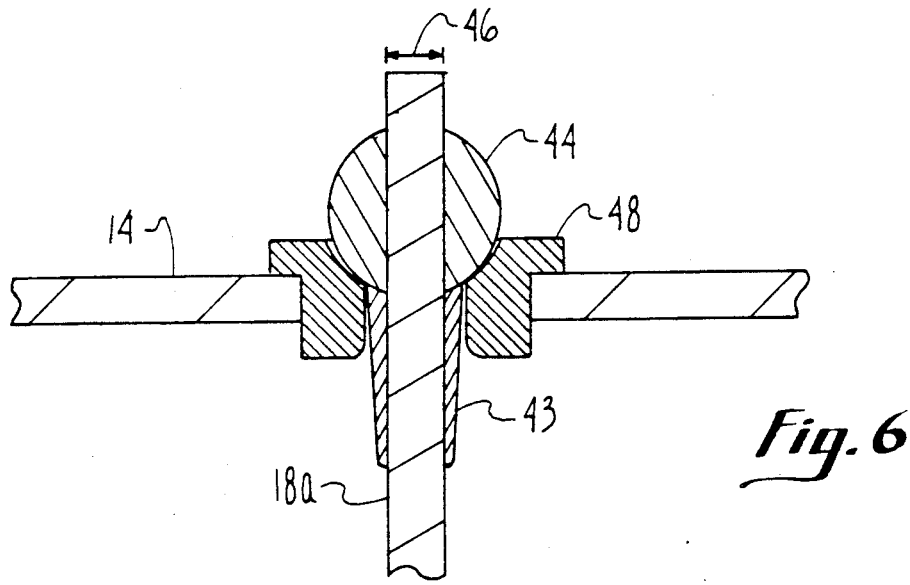
FIG. 6 is a cross-sectional view of the suspension cable top plate mounting mechanism as seen along the line 6—6 in FIG. 2.

Now referring to FIG. 5, the particular arrangement for mounting tensioning cables 22 and stiffeners 20 to top plate 14 may be seen. As will be more fully appreciated after further disclosure, end effector 10 is configured with two of the tensioning devices, or rigidizers 51a and 51b shown in FIG. 2. In particular, taking rigidizer 51a as an example, FIG. 5 shows two cables 22a and 22b and one stiffener 20a which are each attached to a pivot arm 50a to form, in combination, the rigidizer 51a. The pivot arm 50a is itself attached to mounting bracket 52a by pivot pin 54a to allow for pivotal motion of the pivot arm 50a about pivot pin 54a. Mounting bracket 52a is in turn fixedly attached to top plate 14 by any means well-known in the art, such as by bolting. As seen in FIG. 5, the cables 22a, 22b are fixedly attached to pivot arm 50a. In contrast, to provide for pivotal motion between pivot arm 50a and stiffener 20a and, hence, substantially frictionless compliance of end effector 10, stiffener 20a is pivotally attached at pivot arm mount 56a to pivot arm 50a. Mount 56a may comprise any suitable pivotal mounting means, such as a pivot pin or ball joint. A stop extension 58a is also formed on pivot arm 50a to contact top plate 14 when pivot arm 50a is in its compliant position. This accordingly limits the degree of pivotal motion of pivot arm 50a about pivot pin 54a. It is to be understood that the construction and operation of rigidizer 51b is substantially identical to the construction and operation of rigidizer 51a.

The construction and number of the cables 18a-d, cables 22a-d, and stiffeners 20a, 20b disclosed above are best seen in reference to FIG. 2. Specifically, the present invention contemplates the use of four suspension cables 18a-d of substantially uniform length, two stiffeners 20a-b of substantially uniform length, and four tensioning cables 22a-d of substantially uniform length. Accordingly, as discussed above, end effector 10 also comprises two rigidizers 51a and 51b, with rigidizer 51a comprising arm 50a, tensioning cables 22a, 22b, and stiffener 20a, and rigidizer 51b comprising a tensioning arm 50b, tensioning cables 22c, 22d, and stiffener 20b. Moreover, the above components are disposed symmetrically with respect to other similar components within end effector 10. It will be further appreciated that while the stiffeners 20a, 20b may comprise any device suitable for modifying the configuration of end effector 10 between its compliant configuration and its stiffened configuration in response to remote control orders, in the present invention stiffeners 20a, 20b comprise pneumatic cylinders.

Figure 7:
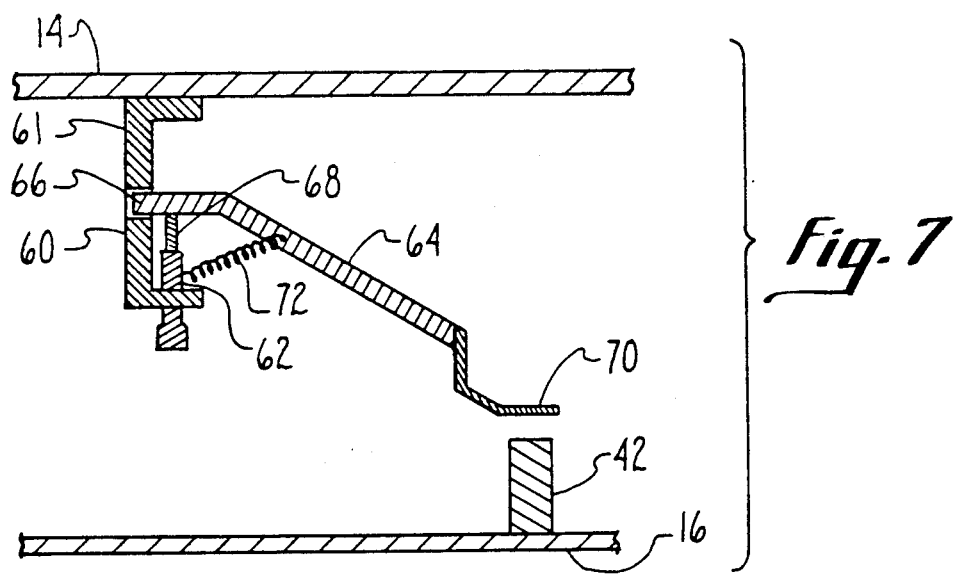
FIG. 7 is a cross-sectional view of the crash protector mechanism as seen along the line 7—7 in FIG. 2, with portions of the novel end effector omitted for clarity.

Still referring to FIG. 2, a crash protecting mechanism 60 may be seen attached to top plate 14. In particular, as best seen in FIG. 7, crash protecting mechanism 60 comprises a mounting bracket 61 attached to top plate 14 for supporting a switch 62. Switch 62 is a normally open, magnetically actuated switch which is electrically connected in series through junction box 34 (seen in FIG. 1) with the electrical control system of the robotics being used in conjunction with end effector 10. While a wide variety of switching devices may be used for switch 62, a magnetic switch is used in the preferred embodiment because such switches are available in sealed stainless steel cases and require minimal supporting electronic circuitry. In addition to supporting switch 62, mounting bracket 61 is pivotally attached to a pivot plate 64 at pivot 66. Pivot 66 comprises any well-known pivoting device, such as a pivot pin. A slug 68 is fixedly attached to pivot plate 64, as shown in FIG. 2. At its end opposite to pivot 66, pivot plate 64 is fixedly attached to paddle 70. A spring 72 is in turn fixedly mounted in tension between mounting bracket 62 and pivot plate 64. When so mounted, spring 72 urges pivot plate 64 toward bottom plate 16 and away from top plate 14.

Finally, stringent requirements exist for the material composition of the components of end effector 10, particularly for applications of end effector 10 in a hostile environment. In particular, the materials of end effector 10 must provide a relatively high degree of strength, while also remaining relatively impervious to caustic chemicals from munitions or washdown. For example, the materials of end effector 10 will ideally continue to operate reliably when exposed to such processes as cryofracture demilitarization, during which end effector 10 may potentially be immersed in a liquid nitrogen bath having a temperature of about $-196°$ C. To this end, the materials of end effector 10 are preferably composed of one or more of the following materials: 300 series stainless steel, teflon, polyethylene, polypropylene, certain epoxies, and some teflon compounds.

In particular, to provide for strength and corrosion resistance in accordance with the discussion above, stiffeners 20 are fabricated of stainless steel. Additionally, cables 18 and 22 are fabricated of one quarter inch ($\frac{1}{4}$") diameter stainless steel aircraft cable. Finally, the plates 14, 16 and the housing 24 all comprise a high-strength, corrosion-resistant stainless steel alloy.

In addition to forming end effector 10 from suitable materials, certain configuration details of end effector 10 may be incorporated to reduce or eliminate end effector 10 sensitivity to potentially hostile environments. Specifically, pneumatic lines for actuating stiffeners 20 are sealed in polypropylene tubing. Additionally, pneumatic valving and logic circuitry associated with end effector 10 are mounted within junction box 34, which, in one embodiment, comprises a stainless steel NEMA 4x enclosure. Moreover, all electrical and pneumatic lines which penetrate housing 24 pass through sealed fittings, and use teflon leads potted in stainless steel collar rings to penetrate the wall of housing 24.

OPERATION

In its operation, end effector 10 is attached to a robot (not shown) at top plate 14. A gripper 12, which may comprise any gripper that is appropriate for the particular application of end effector 10, is attached to bottom plate 16. In preparation for end effector 10 to be lowered onto an article to be gripped, end effector 10 is placed in its compliant configuration, shown in FIG. 4, i.e. rigidizers 51a and 51b allow the cross cables 22 to remain slack. More specifically, cross-referencing FIGS. 4 and 5, it may be seen that end effector 10 is placed in the slack configuration shown in FIG. 4 by actuating stiffeners 20a and 20b (20b not shown in FIG. 5). For clarity of disclosure, only the operation of rigidizer 51a will be discussed.

Figure 4:
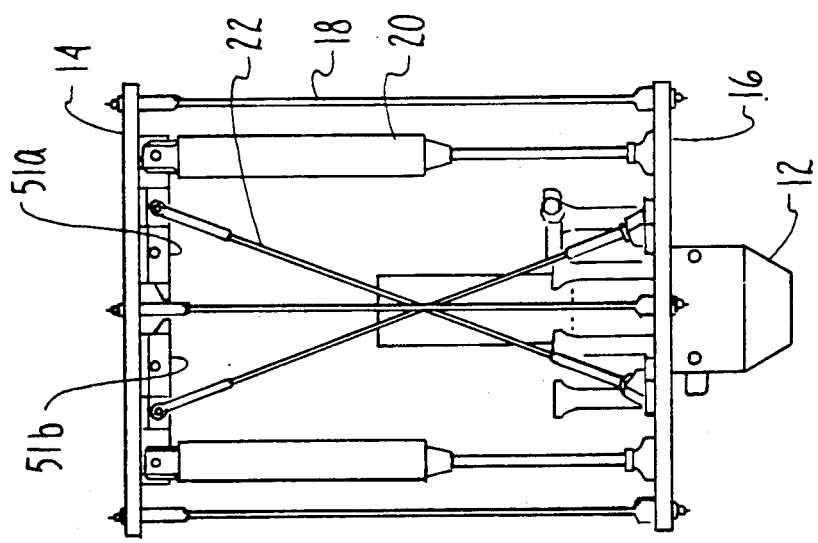
FIG. 4 is a side schematic view of the novel end effector, showing the device in its compliant configuration, with the slackness of the tensioning cables exaggerated for illustration.

As shown in FIGS. 4 and 5, when stiffener 20a is actuated to shift rigidizer 51a to its slack position, stiffener 20a urges pivot arm 50a to pivot about its pivot pin 54a and away from top plate 14. As the pivot arm 50a pivots, stop 58a contacts top plate 14 to limit the motion of pivot arm 50a. When the pivot arm 50a has shifted to its compliant, or slack, position, as shown in FIG. 4, cables 22a and 22b are thereby relaxed to allow for an adequate degree of compliance of end effector 10. Effectively, with cross cables 22a-d relaxed, bottom plate 16 hangs from top plate 14 by the action of suspension cables 18a, b, c, and d. Once in its compliant configuration shown in FIG. 4, end effector 10 may be lowered onto the article to be gripped.

To indicate when gripper 12 may be actuated to engage the target article, sensors 32a-d provide indication of the position and orientation of the target article, while sensors 33a-h can be monitored to classify the target article.

In the event the target article is substantially misaligned, or a logic failure causes end effector 10 to be lowered too far onto the target article, crash protector 60 operates to stop further movement of end effector 10. Specifically, when bottom plate 16 is lowered onto an unanticipated obstruction, it will be appreciated that because end effector 10 is in its compliant configuration, bottom plate 16 substantially comes to rest against the obstruction. Top plate 14, however, continues to lower toward bottom plate 16 and the obstruction. Now-compliant cables 18, 22 and compliant stiffeners 20 absorb the descent of top plate 14. As best seen in FIG. 7, paddle 70 eventually contacts gripper actuator 42 as top plate 14 is lowered toward bottom plate 16. Consequently, pivot arm 64, which is fixedly attached to paddle 70, is forced to pivot against the force of spring 72 about pivot pin 66 toward top plate 14. As it does so, slug 68, which in turn is fixed to pivot arm 64, is urged away from switch 62. Switch 62, it will be recalled, is in electrical connection with the electrical circuitry of the robot. Thus, when slug 68 is urged a sufficient distance away from switch 62, switch 62 operates to interrupt power to the robot and thereby stop the descent of top plate 14. In the present embodiment, switch 62 operates to interrupt power when to plate 14 is lowered approximately one and one-half inches toward an obstructed bottom plate 16.

Figure 3:
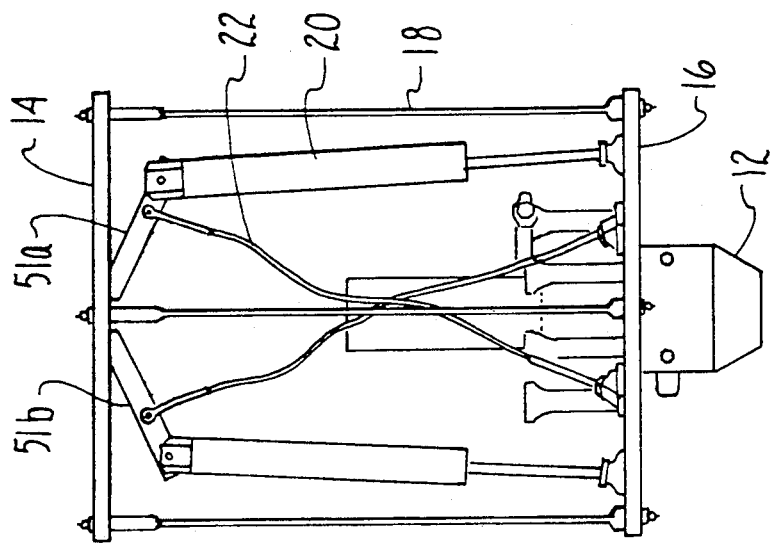
FIG. 3 is a side schematic view of the novel end effector, showing the device in its stiff configuration.

In the event that the target article is adequately aligned and oriented with respect to gripper 12, as indicated by sensors 32, gripper 12 is actuated to engage the target article. To effect proper engagement, gripper actuator 42 pivots finger 28 and locks finger 28 in its extended position, shown in FIG. 2. Once sensors 32 accordingly indicate proper engagement between gripper 12 and the target article, in accordance with the disclosure above, end effector 10 is placed in its stiff configuration by rigidizers 51a and 51b. More particularly, to place end effector 10 in its stiff configuration, and again using rigidizer 51a as an example, stiffener 20a is actuated to urge pivot arm 50a toward top plate 14, as best seen in FIGS. 2 and 5. When so urged, pivot arm 50a places cables 22a and 22b in tension and, in combination with the similar operation of rigidizer 51b, thereby places end effector 10 in its stiff configuration, as shown in FIG. 3. Moreover, by so urging against their respective pivot arms, the stiffeners 20a, 20b tend to force plates 14 and 16 away from each other, increasing the relative stiffness of end effector 10 when it is in its stiff configuration shown in FIG. 3.

While the particular end effector as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A robotic end effector for positioning a gripping mechanism which comprises:

a top plate for attaching said end effector to a robot;

a bottom plate for holding said gripping mechanism;

a plurality of cables interconnecting said top plate with said bottom plate for suspending said bottom plate from said top plate;

a pair of rigidizers, each rigidizer including an arm, an extendable stiffener and a pair of tensioning cables, said arm having a first end pivotally attached to said top plate and a second end, said extendable stiffener having a first end attached to said bottom plate and having a second end pivotably joined with said second end of said arm, and each of said tensioning cables having a first end attached to said bottom plate and a second end attached to said arm intermediate said first and second ends of said arm; and means for simultaneously moving each of said stiffeners between a retracted position wherein said tensioning cables are slack for freely suspending said bottom plate from said top plate and an extended position wherein said tensioning cables are taut for rigidly holding said bottom plate relative to said top plate.

2. A robotic end effector as recited in claim 1 further comprising position sensing means for sensing the position of said article relative to said gripping device.

3. A robotic end effector as recited in claim 2 further comprising classification means to classify said article.

4. A robotic end effector as recited in claim 1 further comprising stopping means to stop said robot when the distance between said top plate and said bottom plate decreases below a predetermined value.

5. A robotic end effector as recited in claim 3 wherein said position sensing means comprises a plurality of magnetic inductance sensors.

6. A robotic end effector as recited in claim 5 wherein said classification means comprises a plurality of magnetic inductance sensors to sense according to the proximity of said article to said sensors.

7. A cable suspension compliance mechanism for use with an article gripping device which comprises:
   a first mounting plate for attaching said mechanism to a robot;
   a second mounting plate disposed substantially parallel to said first mounting plate for attaching said mechanism to said gripping device for gripping said article;
   a plurality of steel cables interconnecting said first and second mounting plates, said cables being suspended between said first and said second plates, said cables substantially maintaining said parallel disposition of said first plate relative to said second plate; and
   a plurality of rigidizers disposed between said first and second plates to selectively establish a predetermined stiffness between said first and second plates, each of said rigidizers including an arm, an extendable stiffener and a pair of tensioning cables, said arm having a first end pivotally attached to said first plate and a second end, said extendable stiffener having a first end attached to said second plate and a second end being pivotally joined with said second end of said arm, and each of said tensioning cables having a first end attached to said second plate and a second end attached to said arm intermediate said first and second ends of said arm whereby movement of said stiffeners from a retracted to an extended position moves its respective tensioning cables from a slack to a taut position to provide stiffness.

8. A cable suspension compliance mechanism as recited in claim 7 further comprising a position sensor means mounted on said second mounting plate to sense the position of said article relative to said gripping device and generate a signal in response thereto.

9. A cable suspension compliance mechanism as recited in claim 8, further comprising stopping means to stop said robot when the distance between said first mounting plate and said second mounting plate decreases below a predetermined value.

10. A cable suspension compliance mechanism as recited in claim 9 wherein said position sensing means comprises a plurality of proximity sensors.

11. A cable suspension compliance mechanism as recited in claim 10 further comprising classification means to classify said article.

12. A cable suspension compliance mechanism as recited in claim 11 wherein said classification means comprises a plurality of magnetic inductance sensors to sense according to the proximity of said article to said sensors.

13. A method for gripping a remote article with a robot, comprising the steps of:
   attaching a first mounting plate to said robot;
   attaching a second mounting plate to said article;
   interconnecting said plates by attaching a plurality of cables therebetween;
   disposing a plurality of stiffening devices between said plates, said stiffening devices each comprising an arm and an extendable stiffener and a pair of tensioning cables, said arm having a first end pivotally attached to said first mounting plate and a second end, said extendable stiffener having a first end attached to said second plate and a second end pivotally joined with said second end of said arm and each of said tensioning cables having a first end attached to said second plate and a second end attached to said arm intermediate said first and second ends of said arm; and
   employing said stiffening devices to shift said selected tensioning cables between stiff and compliant configurations by extending and retracting said extendable stiffeners.

* * * * *